United States Patent
Kingsbury et al.

(10) Patent No.: US 9,734,823 B2
(45) Date of Patent: *Aug. 15, 2017

(54) METHOD AND SYSTEM FOR EFFICIENT SPOKEN TERM DETECTION USING CONFUSION NETWORKS

(71) Applicant: International Business Machines Corporation, Armonk, NY (US)

(72) Inventors: Brian E. D. Kingsbury, Cortlandt Manor, NY (US); Hong-Kwang Kuo, Pleasantville, NY (US); Lidia Mangu, Yorktown Heights, NY (US); Hagen Soltau, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/837,876

(22) Filed: Aug. 27, 2015

(65) Prior Publication Data
US 2016/0005398 A1    Jan. 7, 2016

Related U.S. Application Data

(63) Continuation of application No. 14/230,790, filed on Mar. 31, 2014, now Pat. No. 9,196,243.

(51) Int. Cl.
*G10L 15/05* (2013.01)
*G10L 15/08* (2006.01)
*G10L 15/02* (2006.01)
*G10L 13/08* (2013.01)

(52) U.S. Cl.
CPC ............ *G10L 15/083* (2013.01); *G10L 15/02* (2013.01); *G10L 13/08* (2013.01); *G10L 2015/025* (2013.01); *G10L 2015/085* (2013.01)

(58) Field of Classification Search
None
See application file for complete search history.

(56) References Cited

U.S. PATENT DOCUMENTS

| | | | |
|---|---|---|---|
| 7,941,316 B2 | 5/2011 | Mahajan et al. | |
| 8,290,774 B1 | 10/2012 | Mohri | |
| 8,386,264 B2 | 2/2013 | Hori et al. | |
| 8,543,398 B1 | 9/2013 | Strope et al. | |
| 9,196,234 B2 * | 11/2015 | Little | G10H 1/0008 |
| 2002/0052740 A1 | 5/2002 | Charlesworth et al. | |
| 2007/0185713 A1 | 8/2007 | Jeong et al. | |

(Continued)

OTHER PUBLICATIONS

Aubert et al., Optimization of Weighted Finite State Transducer for Speech Recognition, IEEE Transactions on computers, vol. 62, No. 8, Aug. 2013, pp. 1607-1615.*

(Continued)

*Primary Examiner* — Abul Azad
(74) *Attorney, Agent, or Firm* — Alexa L. Ashworth; Ryan, Mason & Lewis, LLP

(57) ABSTRACT

Systems and methods for spoken term detection are provided. A method for spoken term detection, comprises receiving phone level out-of-vocabulary (OOV) keyword queries, converting the phone level OOV keyword queries to words, generating a confusion network (CN) based keyword searching (KWS) index, and using the CN based KWS index for both in-vocabulary (IV) keyword queries and the OOV keyword queries.

20 Claims, 5 Drawing Sheets

(56) References Cited

U.S. PATENT DOCUMENTS

| | | |
|---|---|---|
| 2009/0030680 A1 | 1/2009 | Mamou |
| 2009/0030894 A1* | 1/2009 | Mamou ................... G10L 15/26 |
| 2010/0185670 A1 | 7/2010 | Krishnan et al. |
| 2011/0144995 A1 | 6/2011 | Bangalore et al. |
| 2011/0145184 A1* | 6/2011 | You ......................... G10L 15/34 706/52 |
| 2012/0059653 A1 | 3/2012 | Adams et al. |

OTHER PUBLICATIONS

H. Sak et al., "On-the-Fly Lattice Rescoring for Real-Time Automatic Speech Recognition," 11th Annual Conference of the International Speech Communication Association (ISCA), Interspeech, Sep. 2010, pp. 2450-2453, Makuhari, Chiba, Japan.

N. Bertoldi et al., "Speech Translation by Confusion Network Decoding," IEEE International Conference on Acoustics, Speech and Signal Processing (ICASSP), Apr. 2007, pp. 1297-1300, Honolulu, Hawaii.

C. Collins et al., "Visualization of Uncertainty in Lattices to Support Decision-Making," Proceedings of the 9th Joint Eurographics/IEEE VGTC Symposium on Visualization (EUROVIS), May 2007, pp. 51-58, Norrköping, Sweden.

C. Chelba et al., "Indexing Uncertainty for Spoken Document Search," 9th European Conference on Speech Communication and Technology (Eurospeech), INTERSPEECH, Sep. 2005, pp. 61-64, Lisbon, Portugal.

C. Chelba et al., "Retrieval and Browsing of Spoken Content," IEEE Signal Processing Magazine, May 2008, pp. 39-49, vol. 25, No. 3.

T. Hori et al., "Open-Vocabulary Spoken Utterance Retrieval Using Confusion Networks," IEEE International Conference on Acoustics, Speech and Signal Processing (ICASSP), Apr. 2007, pp. 73-76, vol. 4, Honolulu, Hawaii.

X. Zhang et al., "Fast Approximate Matching Algorithm for Phone-Based Keyword Spotting," Journal of Networks, Oct. 2013, pp. 2227-2233, vol. 8, No. 10.

L. Mangu et al., "Finding Consensus in Speech Recognition: Word Error Minimization and Other Applications of Confusion Networks," Computer Speech & Language, Oct. 2000, pp. 373-400, vol. 14, No. 4.

D. Can et al., "Lattice Indexing for Spoken Term Detection," IEEE Transactions on Audio, Speech, and Language Processing, Nov. 2011, pp. 2338-2347, vol. 19, No. 8.

M. Saraclar et al., "Lattice-Based Search for Spoken Utterance Retrieval," Proceedings of HLT-NAACL, May 2004, pp. 129-136.

C. Parada et al., "Query-by-Example Spoken Term Detection for OOV Terms," IEEE Workshop on Automatic Speech Recognition & Understanding (ASRU), Nov.-Dec. 2009, pp. 404-409, Merano, Italy.

P. Yu et al., "A Hybrid Word/Phoneme-Based Approach for Improved Vocabulary-Independent Search in Spontaneous Speech," 8th International Conference on Spoken Language Processing (ICSLP), INTERSPEECH, Oct. 2004, pp. 293-296, Jeju Island, Korea.

D. Vergyri et al., "The SRI/OGI 2006 Spoken Term Detection System," 8th Annual Conference of the International Speech Communication Association (ISCA), INTERSPEECH, Aug. 2007, pp. 2393-2396, Antwerp, Belgium.

V.T. Turunen et al., "Indexing Confusion Networks for Morph-Based Spoken Document Retrieval," Proceedings of the 30th Annual International ACM SIGIR Conference on Research and Development in Information Retrieval, Jul. 2007, 8 pages, Amsterdam, The Netherlands.

Keith Vertanen, "Combining Open Vocabulary Recognition and Word Confusion Networks," IEEE International Conference on Acoustics, Speech and Signal Processing (ICASSP), Mar.-Apr. 2008, pp. 4325-4328.

S. Nakagawa et al., "A Robust/Fast Spoken Term Detection Method Based on a Syllable n-gram Index with a Distance Metric," Speech Communication, Mar. 2013, pp. 470-485, vol. 55, No. 3.

M. Akbacak et al., "Open-Vocabulary Spoken Term Detection Using Graphone-Based Hybrid Recognition Systems," IEEE International Conference on Acoustics, Speech and Signal Processing (ICASSP), Mar.-Apr. 2008, pp. 5240-5243.

I. Szöke et al., "Sub-Word Modeling of Out of Vocabulary Words in Spoken Term Detection," IEEE Spoken Language Technology Workshop (SLT), Dec. 2008, pp. 273-276, Goa, India.

D. Can et el., "Effect of Pronunciations of OOV Queries in Spoken Term Detection," IEEE International Conference on Acoustics, Speech and Signal Processing (ICASSP), Apr. 2009, pp. 3957-3960, Taipei, Taiwan.

U.V. Chaudhari et al., "Matching Criteria for Vocabulary-Independent Search," IEEE Transactions on Audio, Speech, and Language Processing, Jul. 2012, pp. 1633-1643, vol. 20, No. 5.

J. Mamou et al., "Vocabulary Independent Spoken Term Detection," Proceedings of the 30th Annual International ACM SIGIR Conference on Research and Development in Information Retrieval, Jul. 2007, pp. 615-622, Amsterdam, The Netherlands.

Z.-Y. Zhou et al., "Towards Spoken-Document Retrieval for the Internet: Lattice Indexing for Large-Scale Web-Search Architectures," Proceedings of the Human Language Technology Conference of the North American Chapter of the Association for Computational Linguistics (ACL), Jun. 2006, pp. 415-422.

L. Mangu et al., "Exploiting Diversity for Spoken Term Detection," IEEE International Conference on Acoustics, Speech and Signal Processing (ICASSP), May 2013, pp. 8282-8286, Vancouver, British Columbia, Canada.

L. Mangu et al., "Error Corrective Mechanisms for Speech Recognition," IEEE International Conference on Acoustics, Speech and Signal Processing (ICASSP), May 2001, pp. 29-32, vol. 1.

"IARPA Broad Agency Announcement IARPA-BAA-11-02," IARPA Incisive Analysis Office, Apr. 2011, 46 pages.

Nist, "The Spoken Term Detection (STD) 2006 Evaluation Plan," http://www.nist.gov/speech/tests/std/, Sep. 2006, 13 pages.

H. Soltau et al., "The IBM Attila Speech Recognition Toolkit," IEEE Spoken Language Technology Workshop (SLT), Dec. 2010, pp. 97-102.

B. Kingsbury et al., "Scalable Minimum Bayes Risk Training of Deep Neural Network Acoustic Models Using Distributed Hessian-Free Optimization," 13th Annual Conference of the International Speech Communication Association (ISCA) INTERSPEECH, Sep. 2012, pp. 10-13.

H. Soltau et al., "Dynamic Network Decoding Revisited," IEEE Workshop on Automatic Speech Recognition & Understanding (ASRU), Nov.-Dec. 2009, pp. 276-281, Merano, Italy.

C. Allauzen et al., "OpenFst: A General and Efficient Weighted Finite-State Transducer Library," 12th International Conference on Implementation and Application of Automata (CIAA), Jul. 2007, pp. 11-23, Prague, Czech Republic.

B. Kingsbury et al., "A High-Performance Cantonese Keyword Search System," IEEE International Conference on Acoustics, Speech and Signal Processing (ICASSP), May 2013, pp. 8277-8281, Vancouver, British Columbia, Canada.

L. Mangu et al., "The IBM Keyword Search System for the DARPA RATS Program," IEEE Workshop on Automatic Speech Recognition and Understanding (ASRU), Dec. 2013, pp. 204-209, Olomouc, Czech Republic.

* cited by examiner

100

400

500

METHOD AND SYSTEM FOR EFFICIENT SPOKEN TERM DETECTION USING CONFUSION NETWORKS

CROSS-REFERENCE TO RELATED APPLICATION

This application is a Continuation of U.S. patent application Ser. No. 14/230,790, filed on Mar. 31, 2014, the disclosure of which is incorporated herein by reference in its entirety.

This invention was made with Government support under Contract No. W911NF-12-C-0012 awarded by the Department of Defense (DOD). The Government has certain rights to this invention.

TECHNICAL FIELD

The field generally relates to systems and methods for spoken term detection and, in particular, systems and methods for spoken term detection using a word-level confusion network (CN) based index for both in-vocabulary (IV) and out-of-vocabulary (OOV) searches.

BACKGROUND

One of the fundamental difficulties in automatic speech processing is finding a spoken or written term in a collection of audio recordings. Given the vast amount of existing spoken information, with more being produced every day, there is an increasing need for small indices and fast searches.

Typically, known spoken term detection (STD) systems work in two phases: (1) transforming the speech into text format using an automatic speech recognition system (ASR); and (2) building an index from the text. A relatively simple textual format is the 1-best hypothesis from an ASR system. This approach can result in good STD performance if the speech recognition system has low word error rate.

Many known STD systems benefit from having a richer ASR output representation. Several retrieval methods dealing with multiple hypotheses from an ASR system have been proposed, with lattices and confusion networks being used for building STD indices. However, this approach is not able to find terms that are not in the dictionary of the speech recognizer. Many known STD systems index speech recognition lattices and use this index to search for queries. When the keywords are not in the recognition vocabulary (out-of-vocabulary (OOV)), the word indices are not sufficient. In this case, both the OOV queries and the word lattices can be expanded to a phone level using the ASR lexicon.

Approaches based on sub-word units (e.g., phone, graphone, syllable, morph) have been used to solve the OOV issue. For example, retrieval includes searching for a sequence of sub-words representing an OOV term in a sub-word index. Some known approaches are based on searches in sub-word decoding output or searches on the sub-word representation of the word decoding. For example, in order to be able to find OOV terms, speech recognition is performed using sub-word (e.g., morph, fragment, phone) units, or using words, which are mapped to sub-words before a keyword search.

To compensate for errors made by an ASR system, a query term can be expanded using a sub-word confusability model. Since subword-based indices generally yield a lower precision for in-vocabulary (IV) queries compared with word-based indices, the word and subword indices are either used separately for IV and OOV searches, respectively, or combined into one index.

SUMMARY

In general, exemplary embodiments of the invention include systems and methods for spoken term detection and, in particular, systems and methods for spoken term detection using a word-level confusion network (CN) based index for both in-vocabulary (IV) and out-of-vocabulary (OOV) searches. The embodiments of the present invention provide a fast, vocabulary independent algorithm for STD that demonstrates a word-based index is sufficient to achieve good performance for both IV and OOV terms. Previous approaches have required that a separate index be built at the sub-word level and then expanded to allow for matching OOV terms. Such a process, while accurate, is expensive in both time and memory. In the architecture according to embodiments of the present invention, a word-level confusion network (CN) based index is used for both IV and OOV searches, and is implemented using a flexible weighted finite state transducer (WFST) framework.

According to an exemplary embodiment of the present invention, a method for spoken term detection, comprises receiving phone level out-of-vocabulary (OOV) keyword queries, converting the phone level OOV keyword queries to words, generating a confusion network (CN) based keyword searching (KWS) index, and using the CN based KWS index for both in-vocabulary (IV) keyword queries and the OOV keyword queries.

According to an exemplary embodiment of the present invention, a system for spoken term detection, comprises a query module capable of receiving phone level out-of-vocabulary (OOV) keyword queries, a mapping module capable of converting the phone level OOV keyword queries to words, an indexing module capable of generating a confusion network (CN) based keyword searching (KWS) index, and a search module capable of using the CN based KWS index for both in-vocabulary (IV) keyword queries and the OOV keyword queries.

According to an exemplary embodiment of the present invention, a computer program product for spoken term detection comprises a computer readable storage medium having program instructions embodied therewith, the program instructions executable by a processor to cause the processor to perform a method comprising receiving phone level out-of-vocabulary (OOV) keyword queries, converting the phone level OOV keyword queries to words, generating a confusion network (CN) based keyword searching (KWS) index, and using the CN based KWS index for both in-vocabulary (IV) keyword queries and the OOV keyword queries These and other exemplary embodiments of the invention will be described or become apparent from the following detailed description of exemplary embodiments, which is to be read in connection with the accompanying drawings.

BRIEF DESCRIPTION OF THE DRAWINGS

Exemplary embodiments of the present invention will be described below in more detail, with reference to the accompanying drawings, of which.

DETAILED DESCRIPTION OF EXEMPLARY EMBODIMENTS

Exemplary embodiments of the invention will now be discussed in further detail with regard to systems and methods for spoken term detection and, in particular, systems and methods for spoken term detection using a word-level confusion network (CN) based index for both in-vocabulary (IV) and out-of-vocabulary (OOV) searches. This invention may, however, be embodied in many different forms and should not be construed as limited to the embodiments set forth herein.

Embodiments of the present invention provide an indexing and search pipeline which uses the same word index for both in-vocabulary (IV) and out-of-vocabulary (OOV) queries. Instead of creating a phone index to be able to search for OOV queries, embodiments of the present invention convert the phone level OOV queries to words by, for example, mapping the phone level OOV queries to the closest words in the dictionary from a phonetic point of view. As a result, the index is allowed to be kept at a word level, thereby reducing the indexing and search time significantly. This strategy can be applied to any type of structure used for indexing (e.g., lattice, confusion network, etc.).

In addition, embodiments of the present invention build the index from confusion networks which are smaller than lattices (e.g., 100 times smaller than lattices), therefore reducing the indexing/search time, as well as the disk space requirements for the entire process. Embodiments of the present invention include a CN based keyword spotting (KWS) system, which has a very small index compared to the lattice-based KWS. There have been attempts to use CNs for KWS, but all of them treated CNs as another form of (small) lattice, not taking into account their specific features, such as, for example, epsilon transitions, scores of the multi-word phrases, etc. Prior approaches used CNs only for the IV words. The CN based KWS system in accordance with the embodiments of the present invention can deal with both IV and OOV queries and is comparable or outperforms the baseline lattice approach, while being orders of magnitude faster with a very small footprint.

More specifically, embodiments of the present invention provide a WFST STD architecture in which a word index created from confusion networks (CNs) is sufficient for high-performance IV and OOV retrieval. By replacing lattices with confusion networks which are much smaller, and eliminating the need for sub-word units in the index, embodiments of the present invention ensure a very small footprint index.

Figure 1:
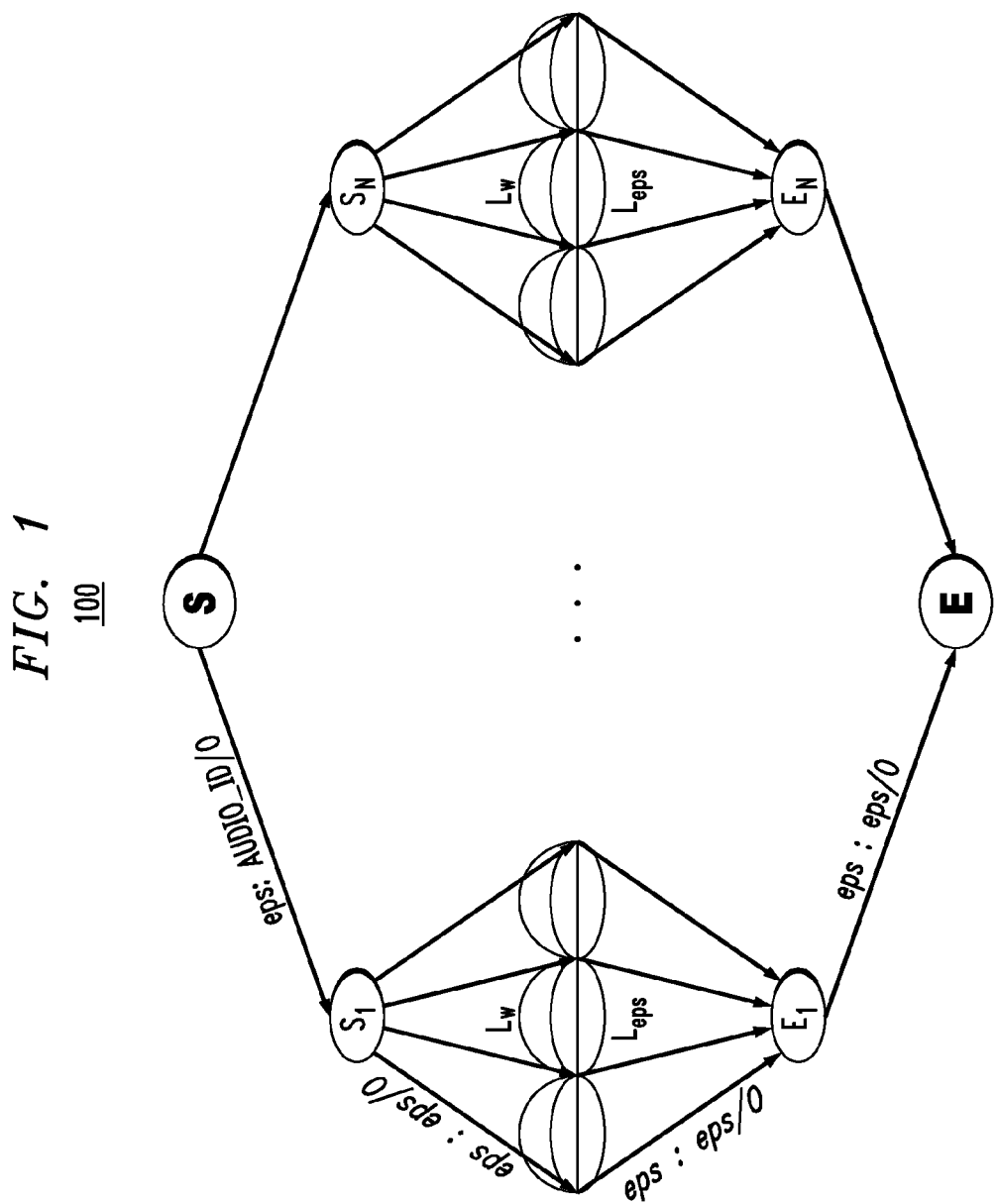
FIG. 1 is a diagram of a CN-based WSFT word index which can be used for both IV and OOV keyword searches, in accordance with an exemplary embodiment of the present invention.

Referring to FIG. 1, a CN-based WSFT word index 100 is shown, which can be used for both IV and OOV keyword searches, in accordance with an embodiment of the present invention. CNs have a linear structure, representing competing word hypotheses and their posterior probabilities in consecutive time intervals (e.g., confusion bins).

Figure 2:
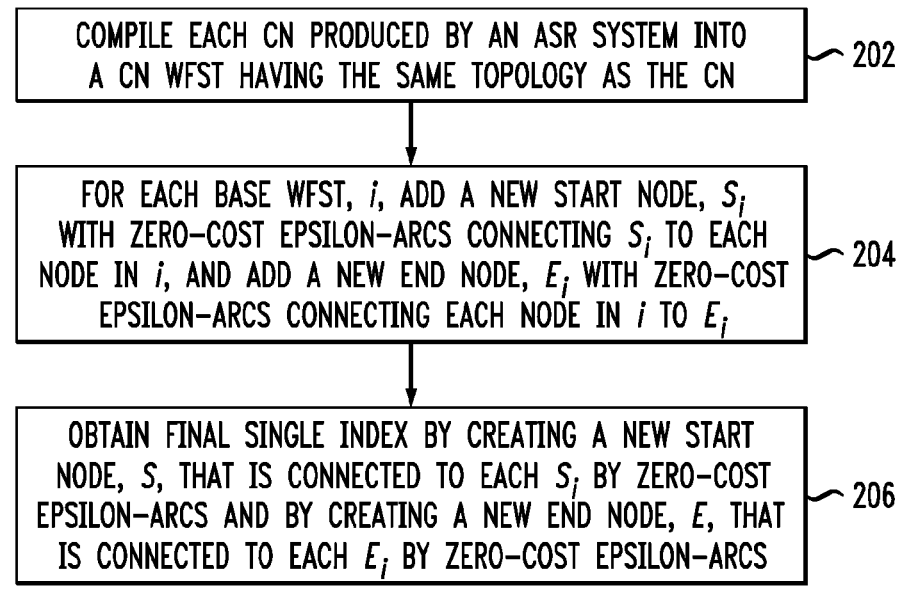
FIG. 2 is a flow diagram illustrating a method for construction from confusion networks of a word index containing the information needed for keyword searches, in accordance with an exemplary embodiment of the present invention.

Referring to FIG. 2, a word index containing all the information needed for keyword searches (e.g., audio file (utterance) identity, start time, end time, and word label) is constructed from confusion networks using the following steps, in accordance with an embodiment of the present invention.

At block 202, each CN produced by an ASR system is compiled into a CN weighted finite state transducer (WFST) having the same topology as the CN. The topology includes input labels that are the words on each arc in the CN, output labels that encode the start time (T start) and end time (T end) of each arc as T start-T end strings, and costs that are negative log CN posteriors for each arc. Some bins in a CN have deletion/epsilon (eps) arcs. Silence, hesitations and other filler words are not written into the index; instead, the silence, hesitation and other filler words contribute to the posterior probability of these epsilon arcs. That is, the score of a deletion in a bin will be 1 minus the sum of posteriors of real words, and any skip over a CN bin will be penalized according to this.

In order to be able to access any substring of words in the CN WFST, i, produced in the previous step, at block 204, for each base WFST, i, a new start node, $S_i$ is added to produce a factor automaton, with zero-cost epsilon-arcs connecting $S_i$ to each node in i, and a new end node, $E_i$ is added, with zero-cost epsilon-arcs connecting each node in i to $E_i$.

At block 206, the final single index is obtained by creating a new start node, S, that is connected to each $S_i$ by zero-cost arcs with input label epsilon and output label i (or audio file id), and by creating a new end node, E, that is connected to each $E_i$ by zero-cost epsilon-arcs. As a result, the factor automatons are merged into a single index.

With the CN-based index structure shown in FIG. 1, a user can retrieve any word or sequence of words from the original CNs, and the corresponding time interval and audio file id.

In-Vocabulary Search

Given the linear structure of the CNs, searching for an in-vocabulary keyword can be relatively straightforward, similar to searching in the 1-best hypothesis of a recognizer. Unlike the 1-best hypothesis scenario where multi-word queries are found in consecutive positions, the multi-word queries can be found in non-consecutive bins in a CN. It has been concluded that CNs might not be appropriate for multi-word query searches due to the presence of epsilon links. However, a WFST framework in accordance with an embodiment of the present invention elegantly addresses the presence of the epsilon links. In accordance with an embodiment of the present invention, when multi-word queries are found in non-consecutive bins, their score is decreased according to the probability of the traversed epsilon links. Thus, the epsilon arcs in the WFST index control which bins can be skipped in a confusion network and with what penalty. Also, the semi-ring chosen for building the index is able to specify the method for combining the scores of the word components for a multi-word query. For example, if a Log semi-ring is chosen, then the scores will be added (i.e., posteriors will be multiplied), or if a Min-Max semi-ring is chosen, the minimum score will be chosen as the score for the entire keyword.

Figure 3:
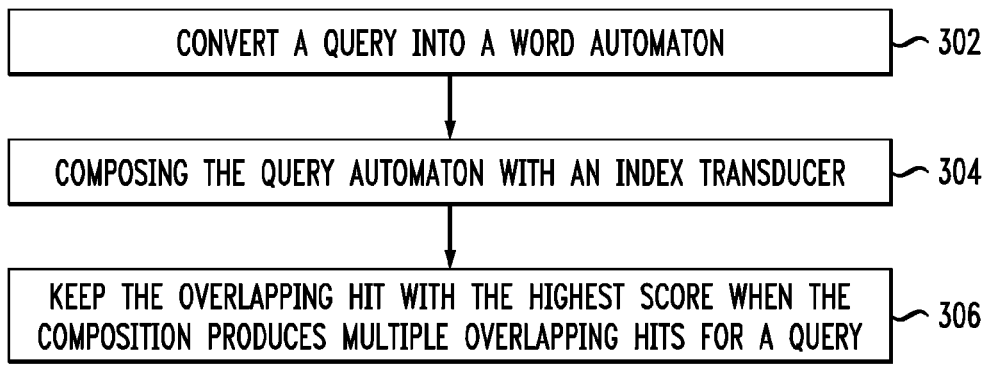
FIG. 3 is a flow diagram illustrating a method for an IV search, in accordance with an exemplary embodiment of the present invention.

Referring to FIG. 3, an IV search, in accordance with an embodiment of the present invention includes converting a query into a word automaton (block 302), and composing the query automaton with an index transducer (block 304). Due to the epsilon arcs in the index, the composition will produce sometimes multiple overlapping hits for a query; among those only the one with the highest score is kept (block 306). The output labels in the resulting FST contain everything that is needed to locate the hit, namely, the audio file id and the start/end time.

In other words, in order to search the CN index for an IV query, the query is compiled into a finite state acceptor for the word sequence that is then composed with the index. If overlapping hits are produced, only the highest scoring hit is output.

Out-of-Vocabulary Search

The OOV search is similar to the IV search, requiring an extra step of the conversion of OOV keywords into in-vocabulary words which sound similar. For this extra step, three transducers are needed: (1) a word to phone transducer (W2P) which is created using a letter to sound model for OOV words and the ASR lexicon for the IV words (for the case in which the multi-word OOV has IV components); (2) a phone confusability transducer (P2P) which specifies pairs of confusable phones and the probability of the confusion; and (3) a phone to word transducer (P2W) built using the ASR lexicon.

Figure 4:
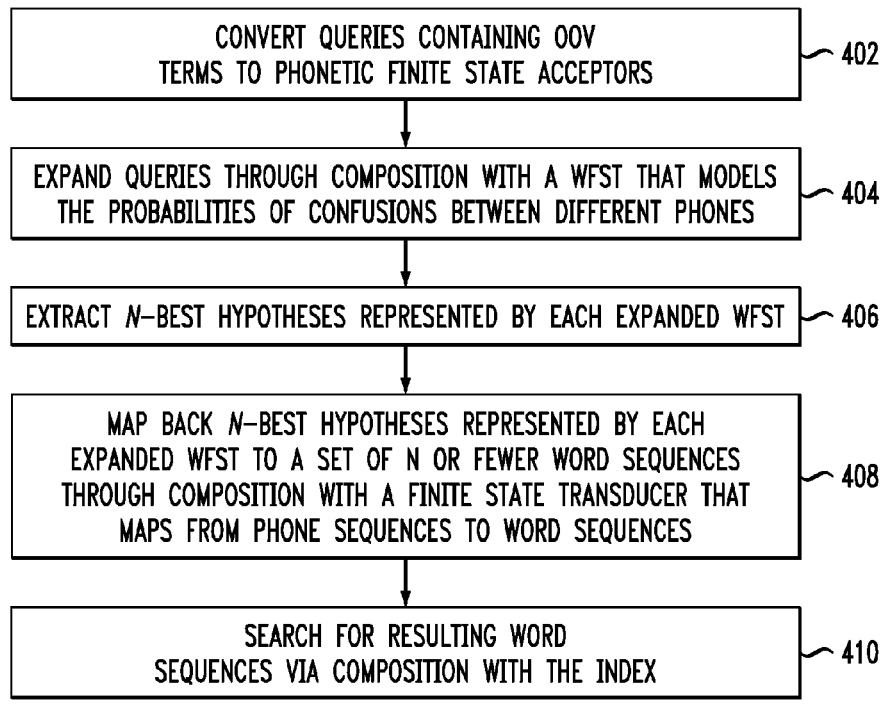
FIG. 4 is a flow diagram illustrating a method for an OOV search, in accordance with an exemplary embodiment of the present invention.

In general, an OOV search in accordance with an embodiment of the present invention, is implemented via query expansion as follows. Referring to FIG. 4, queries containing OOV terms are converted to phonetic finite state acceptors, where the phone sequences for IV terms are looked up in the recognition lexicon and the phone sequences for OOV terms are generated with a grapheme-to-phoneme model (block 402). The queries are expanded through composition with a weighted finite state transducer that models the probabilities of confusions between different phones (block 404). The N-best hypotheses represented by each expanded WFST are extracted (block 406), and then mapped back to a set of N or fewer word sequences through composition with a finite state transducer that maps from phone sequences to word sequences (block 408). The resulting word sequences are searched for via composition with the index, as for IV searches (block 410).

Figure 5:
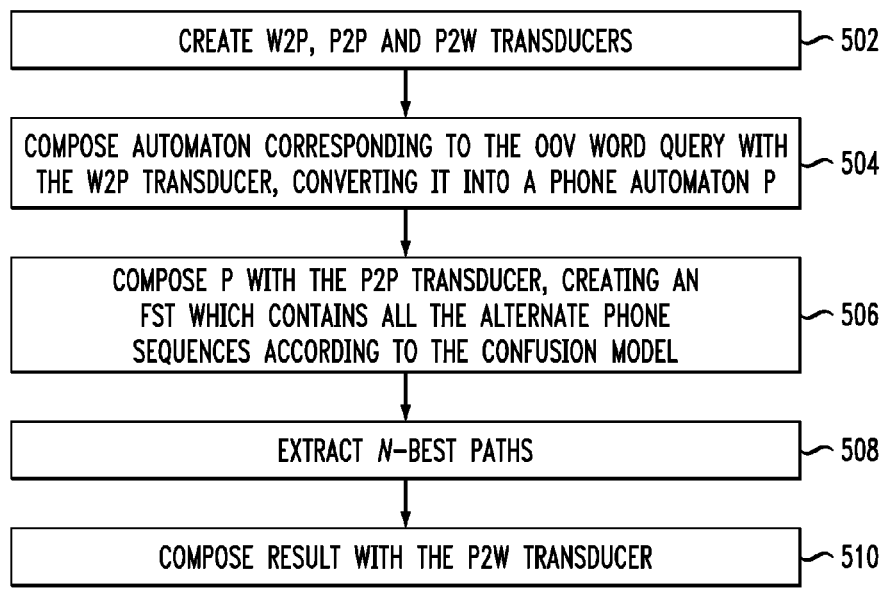
FIG. 5 is a flow diagram illustrating a method for an OOV search, in accordance with an exemplary embodiment of the present invention.

More specifically, referring to FIG. 5, the OOV search consists of the following steps, in accordance with an embodiment of the present invention. At block 502, the W2P, P2P and P2W transducers are created. At block 504, the automaton corresponding to the OOV word query with the W2P transducer, is composed, converting it into a phone automaton P. At block 506, P is composed with the P2P transducer, creating an FST which contains all the alternate phone sequences according to the confusion model. At block 508, N-best paths are extracted, thus keeping only the most likely phone sequences, and at block 510, the result is composed with the P2W transducer. In accordance with an embodiment, an alternate architecture can be obtained by swapping the last two steps.

The result of the last step (block 510) is a set of in-vocabulary word sequences that can be searched for in the word index as a proxy for the OOV keyword which has no chance to be found. Note that if the identity P2P is used, the final FST contains the decompositions of the OOV word into sequences of IV words, if they exist. For example, if meanwhile is the OOV word, and if mean and while are in vocabulary, a search would be for mean while.

The following tables 1-3 show examples of the speed and performance for the CN KWS compared to the lattice KWS.

TABLE 1

Indexing Time

| Method | Hours On One Core | Real-Time Factor (xRT) |
|---|---|---|
| Lattice KWS | 55.9 | 0.363 |
| CN KWS | 0.8 | 0.000524 |

TABLE 2

Search Time

| Method | Hours On One Core | Real-Time Factor (xRT) |
|---|---|---|
| Lattice KWS | 81 | 0.526 |
| CN KWS | 4.7 | 0.0306 |

TABLE 3

Maximum-Term Weighted Value (MTWV)

| Method | MTWV |
|---|---|
| Lattice KWS | 0.5020 |
| CN KWS | 0.5233 |

Figure 6:
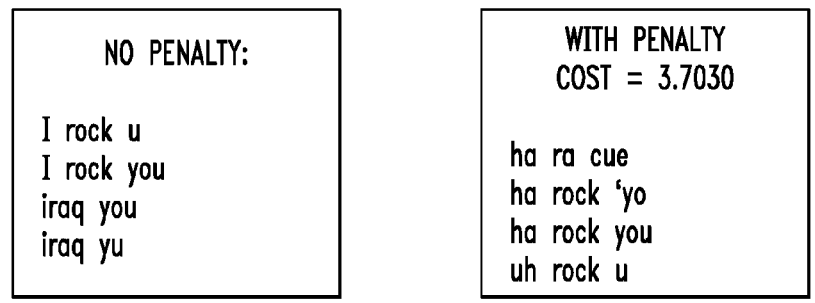
FIG. 6 shows an example for the type of word sequences searched for in place of an OOV word, in accordance with an exemplary embodiment of the present invention.

FIG. 6 shows an example for the type of word sequences searched for in place of an OOV word, in accordance with an embodiment of the present invention. Referring to FIG. 6, which illustrates an OOV to IV mapping example for Tagalog, the OOV word is Iraqi. As can be seen, some of the sequences will be searched for with no penalty, due to the fact that they share a baseform with the OOV word.

In prior work, a multi-word query is considered OOV if at least one word component is not in the vocabulary, and a query expansion module expands all of the words in the query regardless of their IV/OOV status. In an OOV processing module in accordance with an embodiment of the present invention, the transducers involved in processing an OOV query are changed such that only the OOV query components are expanded, while the IV words are kept the same. The new W2P transducer will contain an identity mapping instead of word-to-phone expansion for IV words. In the P2P and P2W transducers, a word identity mapping is added. This procedure has at least the following benefits: (1) for a fixed N-best value, many more hypotheses for the actual OOV words are obtained, due to the fact that the confusions for the IV words are eliminated, and (2) for most tasks, applying a confusability model for the IV words results in loss of precision.

Figure 7:
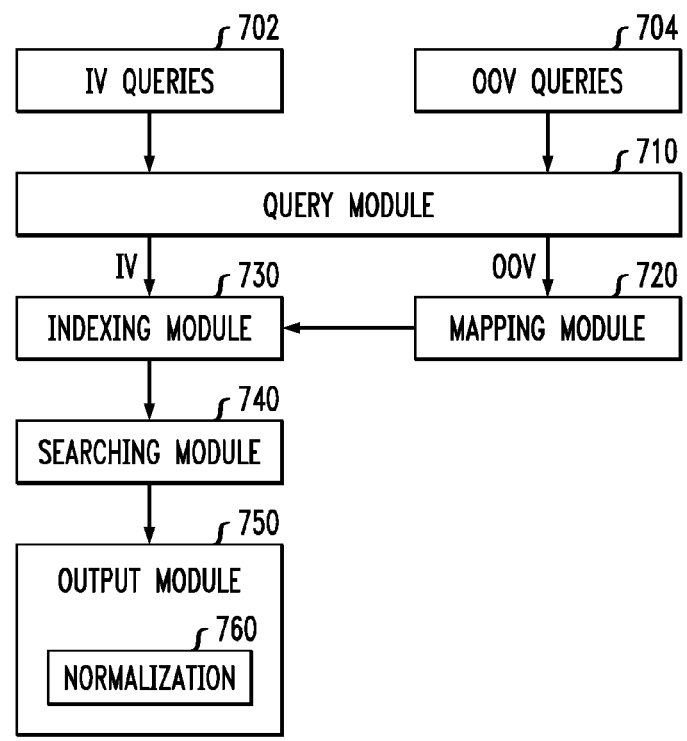
FIG. 7 is high-level diagram showing detail of a system for spoken term detection, according to an exemplary embodiment of the invention.

FIG. 7 shows the proposed system architecture (CN-STD), in accordance with an embodiment of the present invention. A system 700 for spoken term detection, comprises a query module 710 capable of receiving phone level OOV keyword queries 704 and IV keyword queries. In accordance with an embodiment of the present invention, the IV keyword queries are sent to the indexing module 730, and the OOV keyword queries are sent to the mapping module 720. The mapping module 720 converts the phone level OOV keyword queries to words and sends the converted words to the indexing module 730. The indexing module 730 generates a CN based KWS index based on the IV and converted OOV keyword queries. The indexing module 730 constructs the CN based KWS index from a plurality of confusion networks by compiling each confusion network into a WFST having the same topology as the confusion network. Each WFST includes input labels that are words on each arc in the corresponding confusion network, output labels that encode a start time (T start) and an end time (T end) of each arc in the corresponding confusion network as T start-T end strings, and costs that are negative log CN posteriors for each arc in the confusion network.

In accordance with an embodiment of the present invention, for each WFST, the indexing module 730 adds a new start node, $S_i$ with zero-cost epsilon-arcs connecting $S_i$ to each node in the weighted finite state transducer, and adds a new end node, $E_i$ with zero-cost epsilon-arcs connecting each node in the weighted finite state transducer t $E_i$. The indexing module 730 obtains a final single index by creating a new start node, S, that is connected to each $S_i$ by the zero-cost epsilon arcs, and by creating a new end node, E, that is connected to each $E_i$ by the zero-cost epsilon arcs.

A search module 740 uses the CN based KWS index for both IV keyword queries and the OOV keyword queries. The search module 740 uses the CN based KWS index for an IV query by converting the query into a word automaton, composing the query automaton with an index transducer, and if overlapping hits are produced, keeping only a highest scoring hit. The search module 740 uses the CN based KWS index for an OOV query by searching for the resulting word sequences via composition with the CN based KWS index. The output module 750 outputs the search results, and, as described further below, includes a normalization module 760 to normalize posting list scores in order to improve performance.

In accordance with an embodiment of the present invention, the mapping module 720 converts the phone level OOV keyword queries to phonetic finite state acceptors, wherein phone sequences for IV terms are looked up in a recognition lexicon and phone sequences for OOV terms are generated with a grapheme-to-phoneme model. The mapping module 720 also expands the phone level OOV keyword queries through composition with a WFST that models probabilities of confusions between different phones, extracts N-best hypotheses represented by each expanded WFST, and maps back the N-best hypotheses to a set of N or fewer word sequences through composition with a finite state transducer that maps from phone sequences to word sequences.

Score Normalization

In accordance with an embodiment of the present invention, posting list scores are normalized in order to improve performance. In accordance with an embodiment of the present invention, the same normalization as in L. Mangu, H. Soltau, H.-K. Kuo, B. Kingsbury and G. Saon, "Exploiting diversity for spoken term detection," in Proc. ICASSP, 2013, incorporated by reference herein, is used, with the following modification. It is known that high word posteriors in a confusion network are strong indicators that the word is correct. In accordance with an embodiment of the present invention, the normalization such that all the words with a posterior probability above a certain threshold keep their original unnormalized score.

Experimental Setup and Results

Experiments in connection with embodiments of the present invention were conducted in the context of the Intelligence Advanced Research Projects Activity (IARPA) Babel program ("IARPA broad agency announcement IARPA-BAA-11-02," 2011), which focuses on spoken term detection for low-resource languages. The limited language pack track (LP) of the program was chosen, in which 20 hours of audio (10 hours of transcribed data) is used for building ASR models and lexicons. The focus was on 3 of the languages used under this program, namely, Pashto (Pashto LP), Tagalog (Tagalog LP) and Turkish (Turkish LP). For comparison, results are also shown for the full language pack track for one language, Tagalog (Tagalog FP), in which training data consists of 100 hours of speech. In preparation for the Babel evaluation a dev set (DEV) for training was received, 20 hours of audio for each language. After the evaluation, the National Institute of Standards and Technology (NIST) released references for a portion of the evaluation data (10 hours), which were used together with all the evaluation queries to create another set (EVAL). There are more queries in EVAL (1700-2100) compared to DEV (300-600). Results are reported on both DEV and EVAL.

The metric used for the Babel program is Term-Weighted Value (TWV). Keyword search performance is reported in terms of maximum Term-Weighted Value (MTWV), which is the best TWV for all values of a decision threshold.

The acoustic model used in these experiments is the IBM® Speaker-Adapted DNN (SA DNN) system, which uses a deep neural network (DNN) acoustic model with IBM's standard front-end pipeline. The DNN takes 9 frames of 40-dimensional speaker adapted discriminative features as input, contains 5 hidden layers with 1,024 logistic units per layer, and has a final softmax output with 1,000 targets. Training occurs in three phases: (1) layer-wise discriminative pre-training using the cross-entropy criterion, (2) stochastic gradient descent training using back-propagation and the cross-entropy criterion, and (3) distributed Hessian-free training using the state-level minimum Bayes risk criterion. The lexicon was provided with the training data, and the vocabulary contains only words from this data. The language model (LM) is a trigram LM with modified Kneser-Ney smoothing trained only on the acoustic transcripts. The lattices are produced using a dynamic decoder, and confusion networks are generated from these lattices. Compared to a previous CN generation algorithm, a CN generation algorithm in accordance with an embodiment of the present invention is a faster version with the following features: (1) slow total order computation is replaced with a fast local order constraint, (2) time overlap of the clusters to be merged is enforced, and (3) low posterior links are not allowed to participate in the intra-word merging step. The new algorithm is 2-5 times faster than a previous algorithm, and is more robust when the pruning threshold is very low, which can be important for STD tasks. Table 4 shows 1.3%-1.5% absolute improvements in WER (Word Error Rate) due to the lattice to CN conversion.

TABLE 4

WER Comparison for lattice and CN 1-best

| WER | Tagalog FP | Tagalog LP | Turkish LP | Pashto LP |
|---|---|---|---|---|
| Lattice 1-best | 53.7 | 63.9 | 65.0 | 65.3 |
| CN 1-best | 52.2 | 62.7 | 63.7 | 63.5 |

In accordance with an embodiment of the present invention, while not limited thereto, the OpenFST Library is used for both indexing and search, and a Log semi-ring is chosen as the semi-ring. A variety of methods can be used for creating the phone confusability transducer. In accordance with an embodiment of the present invention, the evaluation system used a simple method with the following steps: (1) create Viterbi alignments of the training data transcripts using an acoustic model, (2) decode the training data using the same acoustic model and a unigram language model (LM), and (3) compute state-level confusability by comparing the two sets of alignments from the ground truth and decoding hypotheses, respectively. This is converted to phone-level confusability. In accordance with an embodiment of the present invention, as a baseline for the CN based STD, a lattice WFST STD architecture, which was successfully deployed in both Defense Advanced Research Projects Agency (DARPA) RATS and IARPA Babel evaluations, was used. In this architecture a word index built from lattices is used for IV search and a phone index is used for OOV search, after the OOV queries are expanded using the phone confusability transducer. The same phone confusability transducer is used for both lattice and CN approaches. The number of N-best phone sequences to be retained for each OOV word is optimized separately for each framework. The results for Pashto (Table 5), Turkish (Table 6) and Tagalog (Table 7), show that CN-STD performs the same or better for both IV and OOV terms. This conclusion holds also for the full pack condition in which the vocabulary is 3.5 times larger and the WER is 10% absolute better (Table 8). The approaches in accordance with embodiments of the present invention lead to up to 12% relative MTWV improvement.

TABLE 5

MTWV comparison of the lattice and CN STD system on Pashto LP

| System | DEV | | | EVAL | | |
|---|---|---|---|---|---|---|
| | IV | OOV | ALL | IV | OOV | ALL |
| Lattice-STD | 0.2085 | −0.0351 | 0.1846 | 0.2379 | 0.0481 | 0.2122 |
| CN-STD | 0.2312 | 0.0044 | 0.2107 | 0.2464 | 0.0567 | 0.2208 |

TABLE 6

MTWV comparison of the lattice and CN STD system on Turkish LP

| System | DEV | | | EVAL | | |
|---|---|---|---|---|---|---|
| | IV | OOV | ALL | IV | OOV | ALL |
| Lattice-STD | 0.4450 | 0.0591 | 0.3424 | 0.3320 | 0.0419 | 0.2610 |
| CN-STD | 0.4460 | 0.1001 | 0.3526 | 0.3331 | 0.0589 | 0.2646 |

TABLE 7

MTWV comparison of the lattice and CN STD system on Tagalog LP

| System | DEV | | | EVAL | | |
|---|---|---|---|---|---|---|
| | IV | OOV | ALL | IV | OOV | ALL |
| Lattice-STD | 0.2868 | 0.1601 | 0.2586 | 0.3441 | 0.0796 | 0.2511 |
| CN-STD | 0.2945 | 0.1601 | 0.2639 | 0.3452 | 0.0799 | 0.2512 |

TABLE 8

MTWV comparison of the lattice and CN STD system on Tagalog FP

| System | DEV | | | EVAL | | |
|---|---|---|---|---|---|---|
| | IV | OOV | ALL | IV | OOV | ALL |
| Lattice-STD | 0.5281 | 0.1636 | 0.5021 | 0.5673 | 0.1079 | 0.5273 |
| CN-STD | 0.5426 | 0.2880 | 0.5249 | 0.5718 | 0.1307 | 0.5330 |

Regarding the speed and size of the proposed architecture, Table 9 shows that the CN-STD is orders of magnitude smaller and faster than the lattice STD. Note that the search time difference is much larger for the LP track, which has 4 times more OOVs, and therefore many more FST compositions with the large phone-level index.

TABLE 9

Running Time and footprint comparison for a DEV + EVAL run (3963 queries searched in 30 hours of audio) for Tagalog

| | System | Indexing Time | Search Time | Index Size |
|---|---|---|---|---|
| Tagalog LP | Lattice | 576 mins | 7233 mins | 4264 Mb |
| | CN | 8 mins | 360 mins | 201 Mb |
| Tagalog FP | Lattice | 548 mins | 468 mins | 3346 Mb |
| | CN | 5 mins | 60 mins | 157 Mb |

For both IV and OOV posting lists, the hits with scores below a certain threshold (for example 1 e-07 for IV and 1e-08 for OOV) can be eliminated before normalization. This thresholding not only reduces the size of the final posting list, but can also result in improvements in performance.

Embodiments of the present invention may be beneficial in situations where systems are combined using diverse ASR models. For a given set of queries, after the one-time conversion of the OOV queries to IV sequences, the only remaining step is a composition of this FST with the small word CN index for each ASR system. In comparison, each phone-level OOV FST is composed with the large phone-level index corresponding to each ASR component for the baseline lattice approach, which is a time-consuming process. For a 5-system combination for the Tagalog FP system, the total indexing time was reduced from 43 hours to 30 minutes, and the search time from 90 hours to 3 hours. By eliminating all the phonetic indexes for the 5 ASR systems and replacing the word lattice indexes with the much smaller CN indexes, embodiments of the present invention obtain an index which is 25 times smaller than known indexes.

Embodiments of the present invention provide a WFST STD architecture in which a word index created from confusion networks is sufficient for high-performance open vocabulary term retrieval. For each OOV term the sequences of IV words are found which could substitute for the OOV term in the search process. Embodiments of the present invention use a phone confusability transducer as the vehicle for query expansion, although this could be replaced with another sub-word confusability transducer.

In accordance with embodiments of the present invention, the resulting index is very small while improving performance on a variety of languages and conditions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
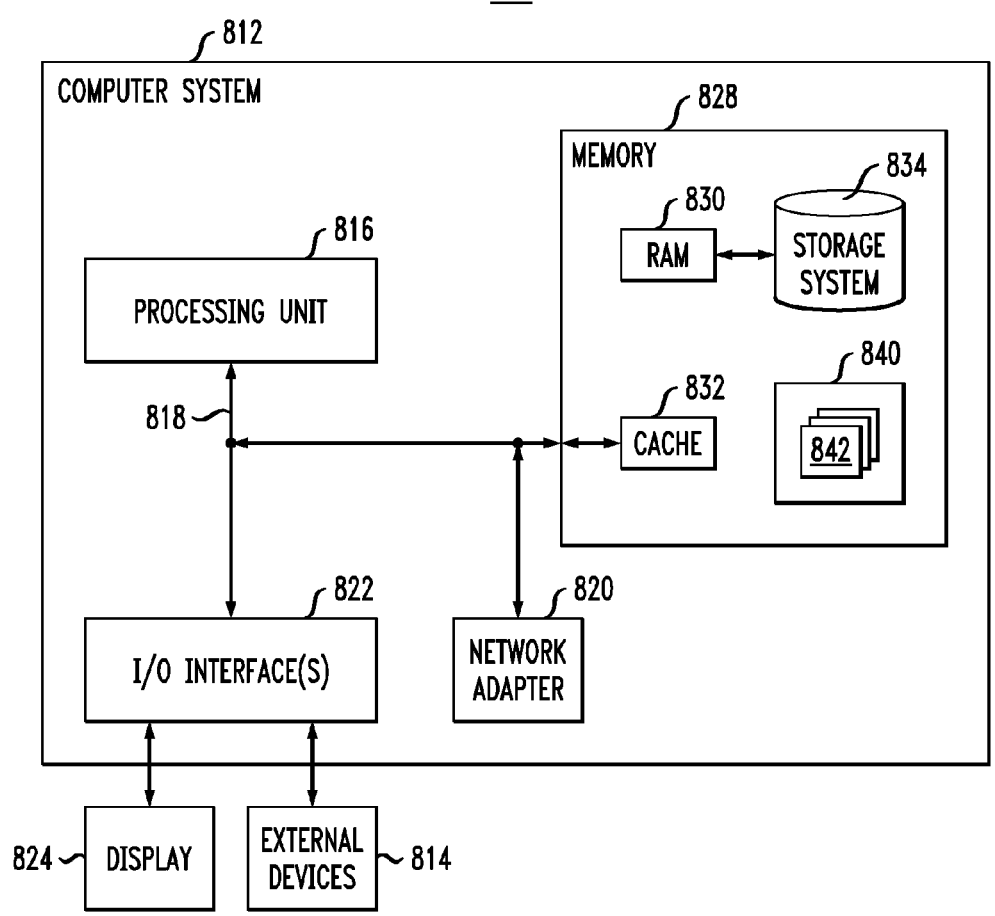
FIG. 8 illustrates a computer system in accordance with which one or more components/steps of the techniques of the invention may be implemented, according to an exemplary embodiment of the invention.

One or more embodiments can make use of software running on a general-purpose computer or workstation. With reference to FIG. 8, in a computing node 810 there is a computer system/server 812, which is operational with numerous other general purpose or special purpose computing system environments or configurations. Examples of well-known computing systems, environments, and/or configurations that may be suitable for use with computer system/server 812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 812 may be described in the general context of computer system executable instructions, such as program modules, being executed by a computer system. Generally, program modules may include routines, programs, objects, components, logic, data structures, and so on that perform particular tasks or implement particular abstract data types. Computer system/server 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 812 in computing node 810 is shown in the form of a general-purpose computing device. The components of computer system/server 812 may include, but are not limited to, one or more processors or processing units 816, a system memory 828, and a bus 818 that couples various system components including system memory 828 to processor 816.

The bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 812 typically includes a variety of computer system readable media. Such media may be any available media that is accessible by computer system/server 812, and it includes both volatile and non-volatile media, removable and non-removable media.

The system memory 828 can include computer system readable media in the form of volatile memory, such as random access memory (RAM) 830 and/or cache memory 832. The computer system/server 812 may further include other removable/non-removable, volatile/nonvolatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 818 by one or more data media interfaces. As depicted and described herein, the memory 828 may include at least one program product having a set (e.g., at least one) of program modules that are configured to carry out the functions of embodiments of the invention. A program/utility 840, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer system/server 812 may also communicate with one or more external devices 814 such as a keyboard, a pointing device, a display 824, etc., one or more devices that enable a user to interact with computer system/server 812, and/or any devices (e.g., network card, modem, etc.) that enable computer system/server 812 to communicate with one or more other computing devices. Such communication can occur via Input/Output (I/O) interfaces 822. Still yet, computer system/server 812 can communicate with one or more networks such as a local area network (LAN), a general wide area network (WAN), and/or a public network (e.g., the Internet) via network adapter 820. As depicted, network adapter 820 communicates with the other components of computer system/server 812 via bus 818. It should be understood that although not shown, other hardware and/or software components could be used in conjunction with computer system/server 812. Examples, include, but are not limited to: microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for spoken term detection, comprising:
   receiving phone level out-of-vocabulary (OOV) keyword queries;
   converting the phone level OOV keyword queries to words;
   generating a confusion network (CN) based keyword searching (KWS) index; and
   using the CN based KWS index for both in-vocabulary (IV) keyword queries and the OOV keyword queries;
   wherein converting the phone level OOV keyword queries to words comprises:
     converting the phone level OOV keyword queries to phonetic finite state acceptors;
     expanding the phone level OOV keyword queries through composition with a first finite state transducer that models probabilities of confusions between different phones;
     extracting hypotheses represented by each expansion; and
     mapping back the hypotheses to a set of N or fewer word sequences through composition with a second finite state transducer that maps from phone sequences to word sequences; and
   wherein the receiving, converting, generating and using steps are performed by a computer system comprising a memory and at least one processor coupled to the memory.

2. The method according to claim 1, wherein generating the CN based KWS index comprises constructing the CN based KWS index from a plurality of confusion networks by compiling each confusion network into a weighted finite state transducer having the same topology as the confusion network.

3. The method according to claim 2, wherein each weighted finite state transducer includes input labels that are words on each arc in the corresponding confusion network.

4. The method according to claim 2, wherein each weighted finite state transducer includes output labels that encode a start time (T start) and an end time (T end) of each arc in the corresponding confusion network as T start-T end strings.

5. The method according to claim 2, wherein each weighted finite state transducer includes costs that are negative log CN posteriors for each arc in the confusion network.

6. The method according to claim 2, wherein for each weighted finite state transducer, the method further comprises adding a new start node, $S_i$ with zero-cost epsilon-arcs connecting $S_i$ to each node in the weighted finite state transducer.

7. The method according to claim 2, wherein for each weighted finite state transducer, the method further comprises adding a new end node, $E_i$ with zero-cost epsilon-arcs connecting each node in the weighted finite state transducer to $E_i$.

8. The method according to claim 6, further comprising obtaining a final single index by creating a new start node, S, that is connected to each $S_i$ by the zero-cost epsilon arcs.

9. The method according to claim 7, further comprising obtaining a final single index by creating a new end node, E, that is connected to each $E_i$ by the zero-cost epsilon arcs.

10. The method according to claim 1, wherein using the CN based KWS index for an IV query comprises:
converting the query into a word automaton;
composing the query automaton with an index transducer; and
if overlapping hits are produced, keeping only a highest scoring hit.

11. The method according to claim 1, wherein phone sequences for IV terms are looked up in a recognition lexicon and phone sequences for OOV terms are generated with a grapheme-to-phoneme model.

12. The method according to claim 1, wherein using the CN based KWS index for an OOV query comprises searching for the resulting word sequences via composition with the CN based KWS index.

13. A system for spoken term detection, comprising:
a query module capable of receiving phone level out-of-vocabulary (OOV) keyword queries;
a mapping module capable of:
converting the phone level OOV keyword queries to words;
converting the phone level OOV keyword queries to phonetic finite state acceptors;
expanding the phone level OOV keyword queries through composition with a first finite state transducer that models probabilities of confusions between different phones;
extracting hypotheses represented by each expansion; and
mapping back the hypotheses to a set of N or fewer word sequences through composition with a second finite state transducer that maps from phone sequences to word sequences
an indexing module capable of generating a confusion network (CN) based keyword searching (KWS) index; and
a search module capable of using the CN based KWS index for both in-vocabulary (IV) keyword queries and the OOV keyword queries;
wherein the query module, the mapping module, the indexing module, and the search module are implemented in at least one processor device coupled to a memory.

14. The system according to claim 13, wherein the indexing module is further capable of constructing the CN based KWS index from a plurality of confusion networks by compiling each confusion network into a weighted finite state transducer having the same topology as the confusion network.

15. The system according to claim 13, wherein phone sequences for IV terms are looked up in a recognition lexicon and phone sequences for OOV terms are generated with a grapheme-to-phoneme model.

16. A computer program product for spoken term detection, the computer program product comprising a computer readable storage medium having program instructions embodied therewith, the program instructions executable by a processor to cause the processor to perform a method comprising:
receiving phone level out-of-vocabulary (OOV) keyword queries;
converting the phone level OOV keyword queries to words;
generating a confusion network (CN) based keyword searching (KWS) index; and
using the CN based KWS index for both in-vocabulary (IV) keyword queries and the OOV keyword queries;
wherein converting the phone level OOV keyword queries to words comprises:
converting the phone level OOV keyword queries to phonetic finite state acceptors;
expanding the phone level OOV keyword queries through composition with a first finite state transducer that models probabilities of confusions between different phones;
extracting hypotheses represented by each expansion; and
mapping back the hypotheses to a set of N or fewer word sequences through composition with a second finite state transducer that maps from phone sequences to word sequences.

17. The computer program product according to claim 16, wherein generating the CN based KWS index comprises constructing the CN based KWS index from a plurality of confusion networks by compiling each confusion network into a weighted finite state transducer having the same topology as the confusion network.

18. The computer program product according to claim 17, wherein each weighted finite state transducer includes input labels that are words on each arc in the corresponding confusion network.

19. The computer program product according to claim 17, wherein each weighted finite state transducer includes output labels that encode a start time (T start) and an end time (T end) of each arc in the corresponding confusion network as T start-T end strings.

20. The computer program product according to claim 17, wherein each weighted finite state transducer includes costs that are negative log CN posteriors for each arc in the confusion network.

* * * * *